(12) United States Patent
Takahashi

(10) Patent No.: US 9,025,182 B2
(45) Date of Patent: May 5, 2015

(54) PRINT SYSTEM HAVING AN INFORMATION PROCESSING DEVICE EXECUTE PROCESSING REQUEST WITH ENCRYPTED CONTROL INFORMATION FROM A PRINT CONTROL DEVICE

(71) Applicant: Canon Kabushiki Kaisha, Tokyo (JP)

(72) Inventor: Takeshi Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/649,180

(22) Filed: Oct. 11, 2012

(65) Prior Publication Data

US 2013/0128306 A1 May 23, 2013

(30) Foreign Application Priority Data

Nov. 17, 2011 (JP) .................................. 2011-251474

(51) Int. Cl.
*G06F 3/12* (2006.01)
(52) U.S. Cl.
CPC ............ *G06F 3/1204* (2013.01); *G06F 3/1226* (2013.01); *G06F 3/1232* (2013.01); *G06F 3/1288* (2013.01)
USPC ...................................................... 358/1.15
(58) Field of Classification Search
None
See application file for complete search history.

(56) References Cited

U.S. PATENT DOCUMENTS

| 8,970,876 | 3/2015 | Takahashi et al. |
| 2011/0205586 A1* | 8/2011 | Takahashi et al. ........... 358/1.15 |
| 2012/0314244 A1* | 12/2012 | Kurihara ...................... 358/1.15 |

FOREIGN PATENT DOCUMENTS

| CN | 102164169 A | 8/2011 |
| EP | 1276041 A2 | 1/2003 |
| JP | 2004-171214 A | 6/2004 |
| WO | 2011/093476 A1 | 4/2011 |

OTHER PUBLICATIONS

Chinese Office Action issued in corresponding application No. 201210462041.3 on Feb. 28, 2015.

* cited by examiner

*Primary Examiner* — Fan Zhang
(74) *Attorney, Agent, or Firm* — Carter, DeLuca, Farrell & Schmidt, LLP

(57) ABSTRACT

An upload service that executes upload processing corresponding to a print service selected by a mobile terminal receives an access from the mobile terminal and the upload service returns an execution request including an instruction character string for calling an upload unit that executes local processing required for execution of the upload processing to the mobile terminal. The mobile terminal executes the local processing by calling the upload unit based on the instruction character string included in the execution request. Upon receiving an upload of a document file to be printed from the upload unit, the upload service saves the document file.

7 Claims, 10 Drawing Sheets

FIG. 5A

| JobID | LocalKey | RouteID | CurrentRouteNo | DataPath | SettingPath | TargetPrinter |
|---|---|---|---|---|---|---|
| job1 | 36fafa84-91be-aaaa-a916-bc666767b65 | Route1 | 1 | ¥¥BEServer¥Dir¥job1.pdf | ¥¥BEServer¥Dir¥job1.xml | MFP1 |
| job2 | 36fafa84-91be-aaaa-a916-bc666767b66 | Route2 | 3 | ¥¥BEServer¥Dir¥job2.pdf | ¥¥BEServer¥Dir¥job2.xml | MFP2 |

FIG. 5B

| RouteID | ServiceNo | ServiceURL |
|---|---|---|
| Route1 | 1 | https://www.printflow.co.jp/upload/ |
| Route1 | 2 | https://www.printflow.co.jp/deviceselect/ |
| Route1 | 3 | https://www.printflow.co.jp/printsettings/ |
| Route1 | 4 | https://www.printflow.co.jp/print/ |
| Route2 | 1 | https://www.printflow.co.jp/upload/ |
| Route2 | 2 | https://www.printflow.co.jp/print/ |

FIG. 5C

| RouteID | RouteName |
|---|---|
| Route1 | Detail printing |
| Route2 | Quick printing |

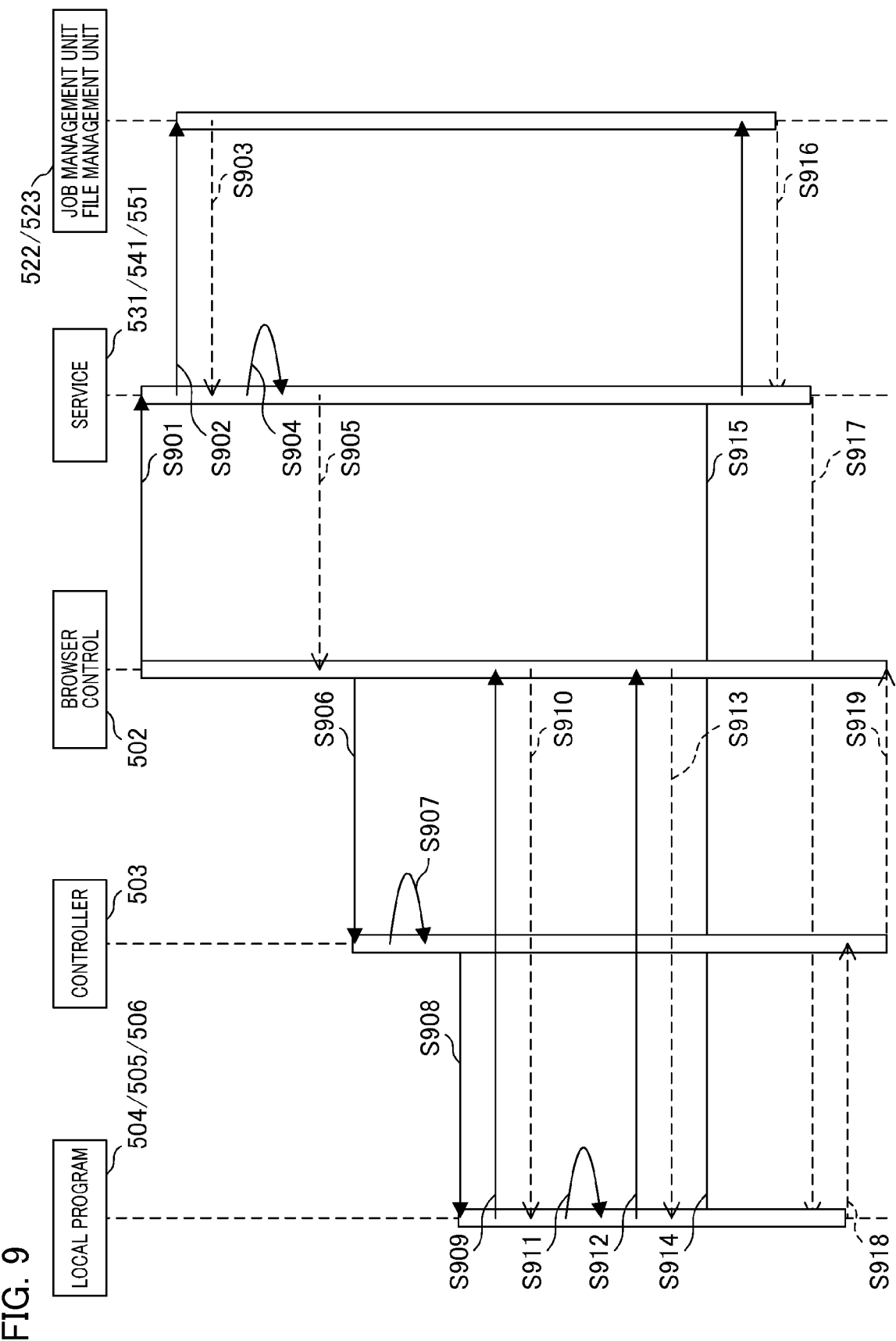

FIG. 10A

```
<Printers>
  <printer>
    <LocalAddress>198.168.0.1</LocalAddress>
    <ID>MFP-1</ID>
  </printer>
  <printer>
    <LocalAddress>198.168.0.2</LocalAddress>
    <ID>MFP-2</ID>
  </printer>
  <printer>
    <LocalAddress>198.168.0.3</LocalAddress>
    <ID>Printer-55</ID>
  </printer>
</PrintSettings>
```

FIG. 10B

```
<Capabilities>
  <Duplex>
    <Item>1-Side</Item>
    <Item>2-Side</Item>
  </Duplex>
  <Color>
    <Item>mono</Item>
    <Item>color</Item>
  </Color>
  <PaperSize>
    <Item>B5</Item>
    <Item>A4</Item>
    <Item>A3</Item>
  </PaperSize>
</Capabilities>
```

FIG. 10C

```
<PrintSettings>
  <Duplex>
    <Item>2-Side</Item>
  </Duplex>
  <Color>
    <Item>mono</Item>
  </Color>
  <PaperSize>
    <Item>A4</Item>
  </PaperSize>
</PrintSettings>
```

PRINT SYSTEM HAVING AN INFORMATION PROCESSING DEVICE EXECUTE PROCESSING REQUEST WITH ENCRYPTED CONTROL INFORMATION FROM A PRINT CONTROL DEVICE

BACKGROUND OF THE INVENTION

1. Field of the Invention

The present invention relates to a print system, print control device, and information processing device.

2. Description of the Related Art

It is often the case that not only PC terminals but also mobile terminals such as smart phones are used as client terminals. Hence, a print system that executes print processing desired by a user who operates a mobile terminal through a print instruction given from the mobile terminal to a Web server for providing a print service via a network is contemplated.

In the print system using a mobile terminal, a mobile environment where a mobile terminal is located changes. Thus, a Web server for providing a print service may need to provide a function complied with the environment where a mobile terminal is located. For example, image forming devices having a print output function, which exist around a mobile terminal, are different depending on the location where the mobile terminal is located. Thus, the Web server needs to cause the mobile terminal to collect information about image forming devices which exist around the mobile terminal, acquire information about the image forming devices, and then cause the mobile terminal to display a selection screen for the image forming devices serving as print output destinations based on the acquired information.

Processing required to be executed by the mobile terminal is not limited to processing for collecting information about image forming devices when a Web server provide a print service. For example, a Web server needs to cause the mobile terminal to execute a print setting or upload a document file to be printed.

Here, a print system is assumed in which a Web server for providing a print service is located on a cloud network (under a cloud environment) as a print control device. In the cloud environment, the Web server cannot autonomously access to a mobile terminal (information processing device) which is located on a local network. This is because any access from the cloud network to the local network is limited by a firewall. Thus, the communication between the Web server and the mobile terminal is executed in a format such that the Web server responds to an access from the mobile terminal. In other words, in a normal environment, it is difficult for the Web server to execute the function of the mobile terminal so as to collect information required for provision of a print service.

Japanese Patent Laid-Open No. 2004-171214 discloses a telephone function execution method in which a client receives data including a link from a server on a network to a local server and then transmits a request to the local server depending on the link selection to thereby cause the local server to execute a local function (telephone function). The local function is a function that is provided in a client located on a local network.

In the telephone function execution method disclosed in Japanese Patent Laid-Open No. 2004-171214, it is necessary to build a Web server local to a client. Since rich resources such as a memory or the like are required for building a Web server, a Web server local to a client is inappropriate as a component provided in a mobile terminal having a strict restriction for resources. Thus, it is necessary to provide a print system which is capable of providing a local function execution instruction from a Web server to an information processing device such as a mobile terminal having a strict restriction for resources so as to feed client information back to the Web server.

Here, a print system in which a mobile terminal downloads a script (e.g., JavaScript (registered trademark)) from a Web server and then calls a module for executing a local function, i.e., a processing execution unit with the downloaded script is contemplated. However, the scheme for calling the local function with the downloaded script is a scheme based on the assumption that the functioning of a mobile terminal is performed under a specified platform such as Android v2.2 or the like, which is inappropriate under consideration of the versatility of OS installed on the mobile terminal. Such an undesirable circumstance may occur not only in a print system but also in any information processing system such as a scanner system or the like.

SUMMARY OF THE INVENTION

An information system of the present invention provides a system in which a control device instructs a local function execution to an information processing device so as to acquire information about the information processing device even when the information processing device has a strict restriction for resources.

According to an aspect of the present invention, a print system is provided that includes an information processing device and a print control device for executing print control processing. The print control device includes at least one print-associated processing unit configured to execute print-associated processing corresponding to a print service selected by the information processing device. The print-associated processing unit includes a reception unit configured to receive an access from the information processing device via a network; a request unit configured to return an execution request to the information processing device as a response to the access from the information processing device via the network, where the execution request is for execution of local processing required for execution of the print-associated processing, and includes control information for calling a processing execution unit which is configured to execute the local processing and is provided in the information processing device; a result reception unit configured to receive the result of execution of the local processing from the information processing device that has called a processing execution unit corresponding to control information included in the execution request executed the local processing via the network; and an association processing execution unit configured to execute the print-associated processing using the result of execution of the local processing received by the reception unit. The information processing device includes a processing execution unit configured to execute the local processing; an access unit configured to access the reception unit provided in the print control device via the network; a request reception unit configured to receive the execution request from the request unit provided in the print control device via the network; a calling unit configured to call the processing execution unit corresponding to the control information included in the execution request received by the request reception unit to thereby cause the processing execution unit to execute the local processing; and a transmission unit configured to transmit the result of execution of the local processing by the processing execution unit to the result reception unit provided in the print control device via the network.

Further features of the present invention will become apparent from the following description of exemplary embodiments with reference to the attached drawings.

BRIEF DESCRIPTION OF THE DRAWINGS

FIGS. 5A to 5C are diagrams illustrating examples of tables managed by servers.

FIG. 9 is a diagram illustrating an example of the detailed processing in steps S812 to S819 shown in FIG. 6.

FIGS. 10A to 10C are diagrams illustrating examples of information configured by XML data.

DESCRIPTION OF THE EMBODIMENTS

Figure 1:
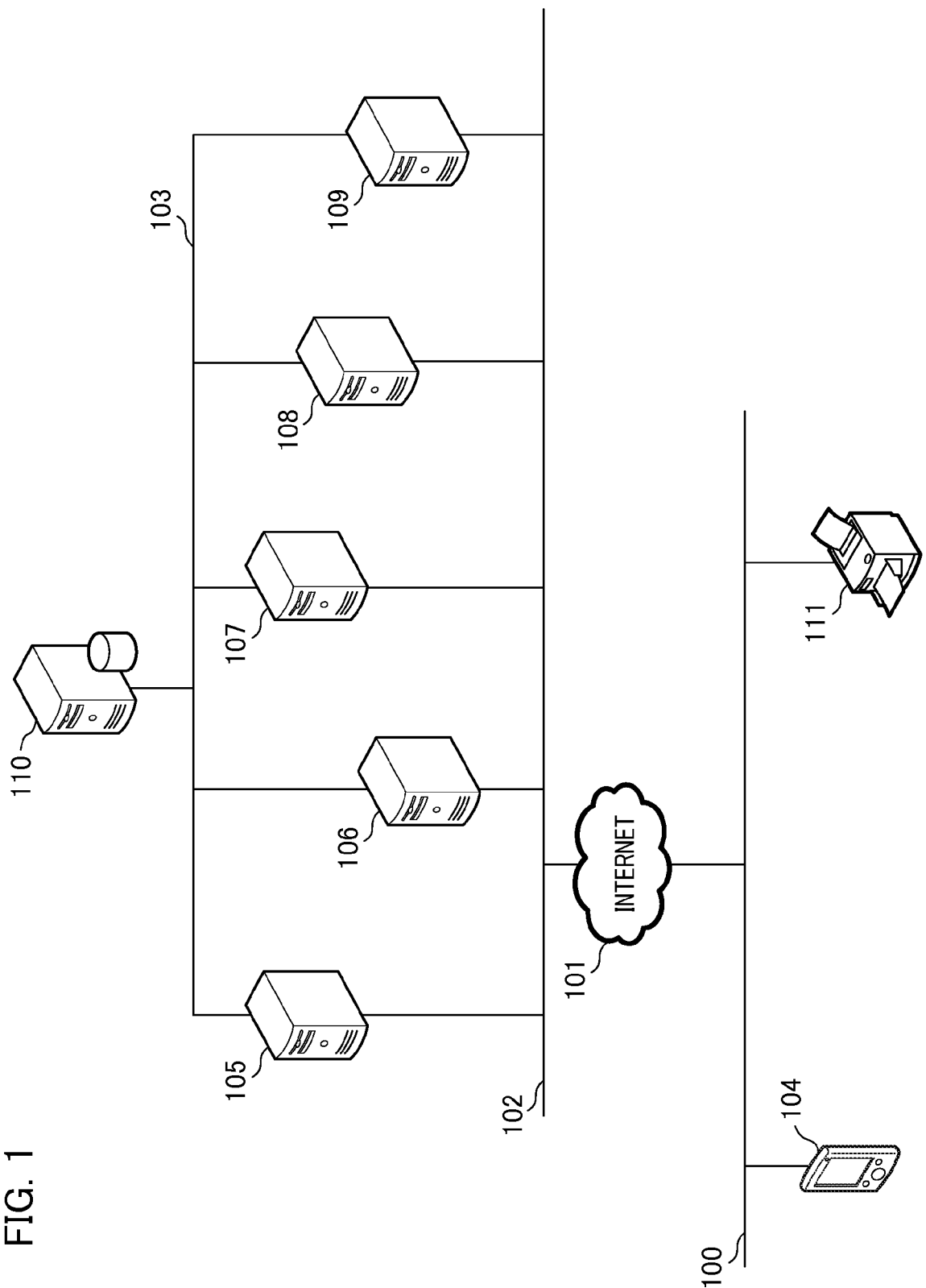
FIG. 1 is a diagram illustrating an example of the configuration of an information processing system of the present embodiment.

FIG. 1 is a diagram illustrating an example of the configuration of an information processing system of the present embodiment. In FIG. 1, a description will be given of the configuration of a print system as an example of an information processing system. The print system shown in FIG. 1 includes a mobile terminal 104, a route management server 105, an upload server 106, a device designation server 107, a print setting server 108, a print server 109, and a DB server 110. The mobile terminal 104 is an information processing device operated by a user. The user performs, for example, a print operation. The route management server 105, the upload server 106, the device designation server 107, the print setting server 108, the print server 109, and the DB server 110 constitute a print control device that executes print control processing. Each server functions as an association processing unit that executes association processing corresponding to an information processing service selected by the mobile terminal 104. In this example, each server particularly functions as a print-associated processing unit that executes print-associated processing corresponding to a print service selected by the mobile terminal 104. In other words, the print control device of the present embodiment includes at least one print-associated processing unit configured to execute print-associated processing corresponding to a print service selected by the information processing device. The control method of the present embodiment is a control method for controlling the print control device, and the computer program of the present embodiment causes a computer to execute the control method.

The route management server 105, the upload server 106, the device designation server 107, the print setting server 108, and the print server 109 are connected to the mobile terminal 104 via a network 102 and Internet 101. The network 102 is a network that opens the servers to the Internet 101. The route management server 105, the upload server 106, the device designation server 107, the print setting server 108, and the print server 109 are connected to the DB server 110 via a network 103. The mobile terminal 104 is connected to an image forming device 111 via a network 100. The network 100 is a local network on the client side.

In the present embodiment, any access from each server to the mobile terminal 104 is limited by a firewall. Thus, each server cannot autonomously access the mobile terminal 104 so that the communication between each server and the mobile terminal 104 is executed in a format such that each server responds to an access from the mobile terminal 104.

Each of the networks 100, 102, and 103 and the Internet 101 is, for example, a communication network that supports a TCP/IP protocol or the like and may be wired or wireless. The image forming device 111 is a print device that acquires print data from the print server 109 and executes printout. When the information processing device of the present embodiment is, for example, a scanner system, the image forming device 111 is a scanner device. The route management server 105 is a server that hosts a service for managing a server that executes print-associated processing for realizing a print service selected by the mobile terminal 104. In other words, the route management server 105 manages a server that is used when the print flow selected by a user of the mobile terminal 104 is realized.

The upload server 106 is a server that hosts a service for receiving an upload of a file to be printed. The device designation server 107 is a server that hosts a service for selecting an image forming device on which print data is to be printed. The print setting server 108 is a server that hosts a service for receiving a print setting. The print server 109 is a server that hosts a service for managing print data and sending the print data upon receiving a request from the image forming device. The DB server 110 is a server that hosts database for holding and managing a print job, print data, and the like.

Figure 2A:
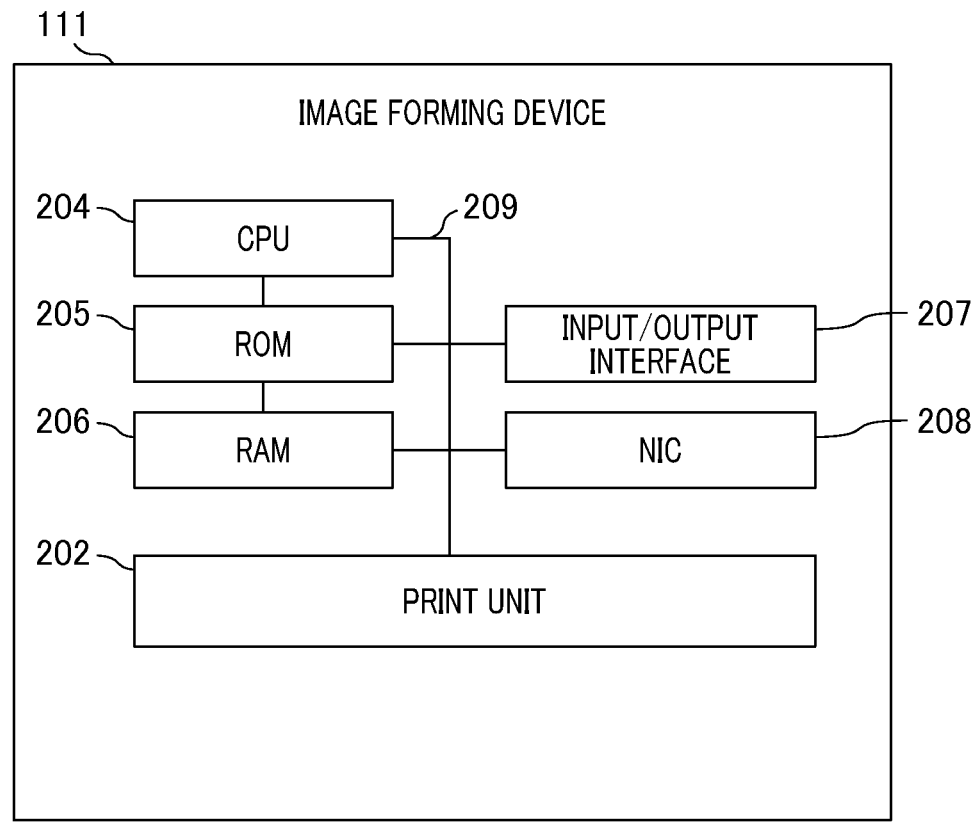
FIG. 2A is a diagram illustrating an example of the hardware configuration of an image forming device.
Figure 2B:
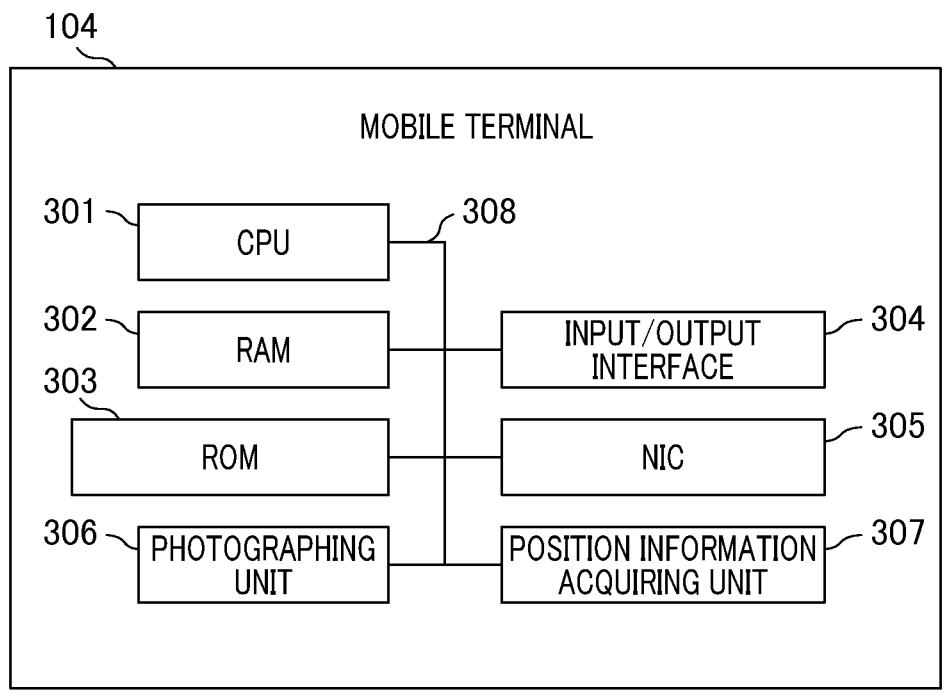
FIG. 2B is a diagram illustrating an example of the hardware configuration of a mobile terminal.

FIGS. 2A and 2B are diagrams illustrating exemplary hardware configuration of an image forming device and a mobile terminal, respectively. FIG. 2A shows the hardware configuration of the image forming device 111. The image forming device 111 includes a print unit 202, a CPU 204, a ROM 205, a RAM 206, an Input/Output interface 207, an NIC 208, and a bus 209, where CPU is an abbreviation for Central Processing Unit, ROM is an abbreviation for Read Only Memory, RAM is an abbreviation for Random Access Memory, and NIC is an abbreviation for Network Interface Card.

The image forming device 111 is controlled by the CPU 204, and outputs an image signal as output information to the print unit (printer engine) 202 connected by the bus 209 based on the control program or the like stored in the ROM for program in the ROM 205. Also, the ROM 205 stores the control program of the CPU 204, font data used upon generating the output information, information used on a host computer, and the like. The ROM 205 also stores an ID for uniquely identifying an image forming device. The CPU 204 communicates with the mobile terminal 104 and the information processing device 105 via the NIC 208. The Input/Output interface 207 mediates an input/output of information to/from an image forming device. The CPU 204 notifies the mobile terminal 104 and the information processing device 105 of information or the like stored in a printer. The RAM 206 functions as the main memory, the work area, and the like of the CPU 204.

FIG. 2B shows the hardware configuration of the mobile terminal 104. The mobile terminal 104 includes a CPU 301, a RAM 302, a ROM 303, an Input/Output interface 304, an NIC 305, a photographing unit 306, a position information acquiring unit 307, and a bus 308.

The CPU 301 not only executes the OS, general-use application, and program loaded into the ROM for program in the ROM 303 but also comprehensively controls devices connected to the bus 308. Also, the ROM 303 stores an operating system program serving as the control program of the CPU 301 and various data. The RAM 302 functions as the main memory, the work area, and the like of the CPU 301. The Input/Output interface 304 controls display on a display screen, key input on a display screen, and the like. The NIC 305 is connected to a network and executes communication control processing for communicating with other devices connected to the network.

Figure 3:
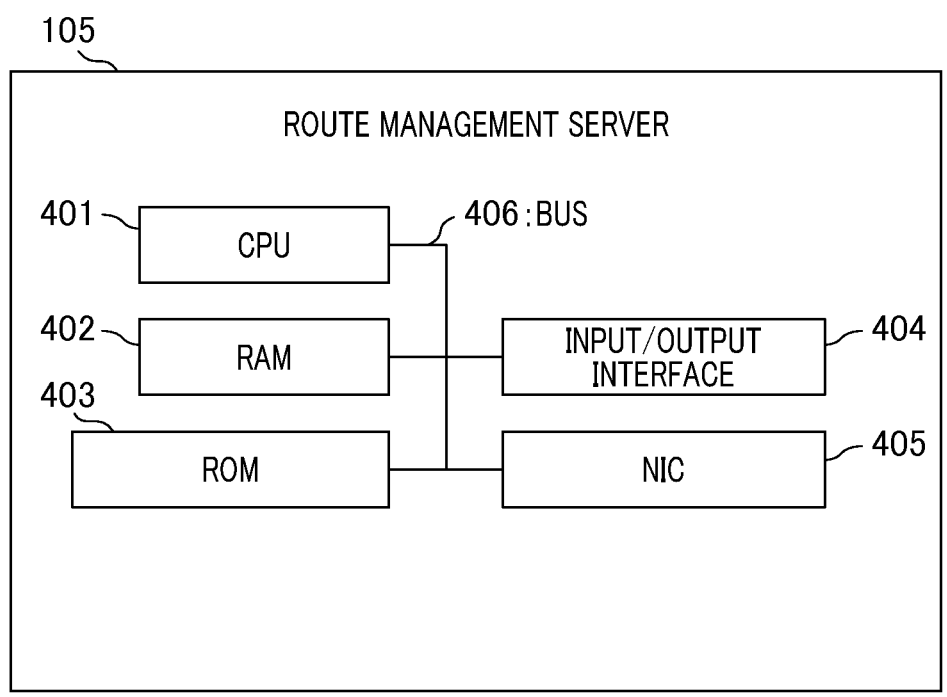
FIG. 3 is a diagram illustrating an example of the hardware configuration of each server.

FIG. 3 is a diagram illustrating an example of the hardware configuration of each server shown in FIG. 1. In FIG. 3, a description will be given by taking an example of the hardware configuration of the route management server 105. The route management server 105 includes a CPU 401, a RAM 402, a ROM 403, an Input/Output interface 404, an NIC 405, and a bus 406. The functions of the CPU 401, the RAM 402, and the ROM 403 are the same as those of the CPU 301, the RAM 302, and the ROM 303, respectively, provided in the mobile terminal 104 shown in FIG. 2. Also, the functions of the Input/Output interface 404, the NIC 405, and the bus 406 are the same as those of the Input/Output interface 304, the NIC 305, and the bus 308, respectively, provided in the mobile terminal 104 shown in FIG. 2B.

Figure 4:
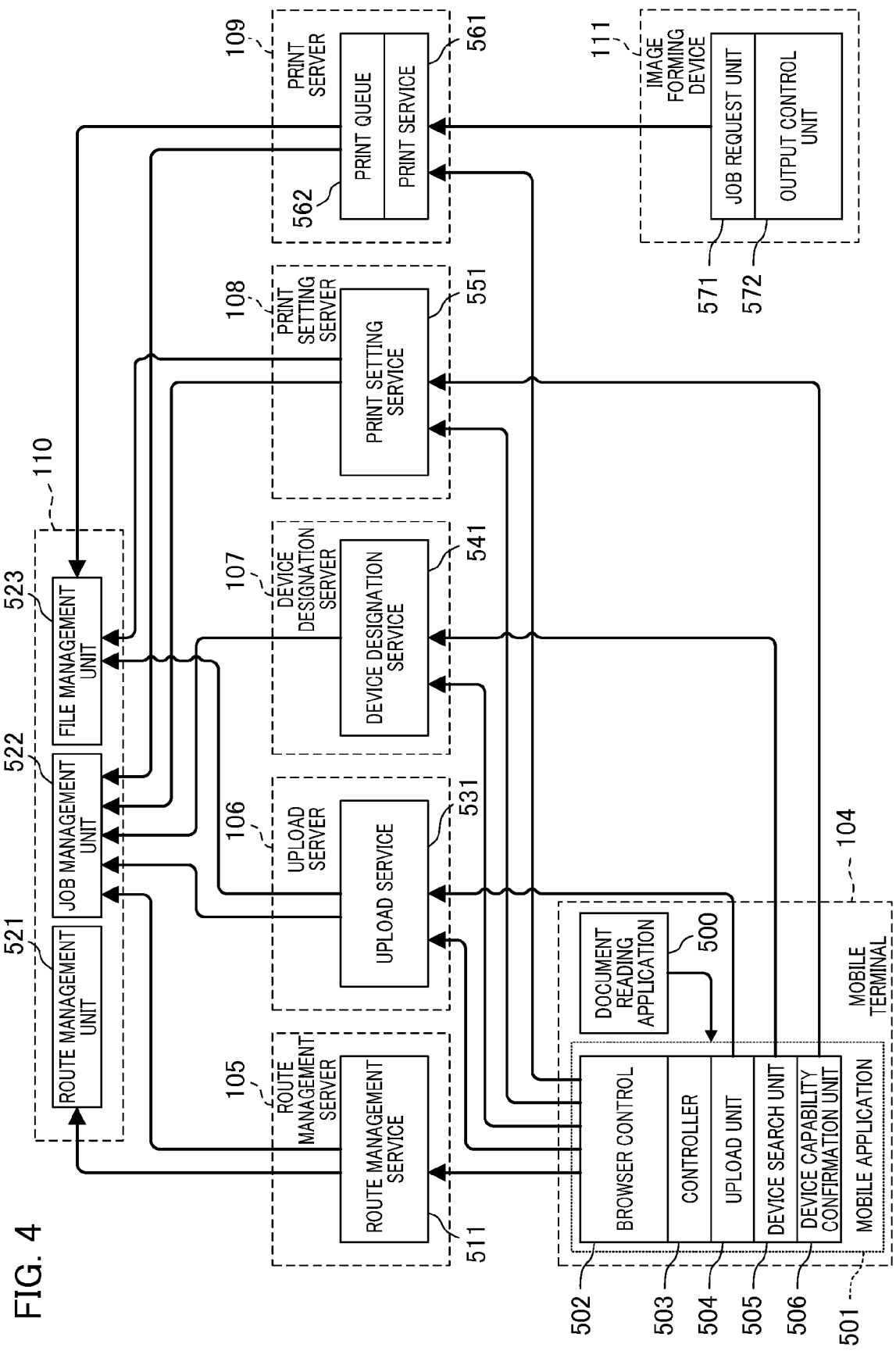
FIG. 4 is an exemplary functional block diagram illustrating a print system.

FIG. 4 is an exemplary functional block diagram illustrating a print system. The mobile terminal 104 includes a document reading application 500 and a mobile application 501. The document reading application 500 is a mobile terminal application installed on the mobile terminal 104. The document reading application 500 has a document reading function so that a user reads a document stored in a mobile terminal. Here, a document is assumed to be a versatile format file such as PDF or image (BMP, JPEG, or the like). The ROM 303 stores a program for realizing a document reading application and the CPU 301 loads the program into the RAM 302 for execution.

The mobile application 501 is an application that executes print processing in cooperation with the servers shown in FIG. 1. The ROM 303 stores a program for realizing a mobile application and the CPU 301 loads the program into the RAM 302 for execution. The mobile application 501 is called from a document management application or the like installed on the mobile terminal 104. The OS stored in the ROM 303 of the mobile terminal 104 has a function of passing a file path operated by a caller to a callee when the mutual calling is made between applications installed on the mobile terminal 104.

The mobile application 501 includes a browser control 502, a controller 503, an upload unit 504, a device search unit 505, and a device capability confirmation unit 506. The browser control 502 has a normal browser function that accesses the designated URL, receives an HTML, and parses and renders the HTML.

The controller 503 is a program that controls monitoring of the browser control 502 and execution of a program group stored in the ROM 303. More specifically, the program group is realized as the upload unit 504, the device search unit 505, and the device capability confirmation unit 506.

The upload unit 504 has a function that uploads the designated document to the designated service. A program for realizing the upload unit 504 is stored in the ROM 303. The device search unit 505 has a function that searches and collects image forming devices connected to the network 100 which is the same local network as that connected to the mobile terminal 104. Also, the device search unit 505 has a function that uploads the collected information to the designated service. A program for realizing the device search unit 505 is stored in the ROM 303.

The device capability confirmation unit 506 has a function that acquires the capability of a specified image forming device connected to the network 100 which is the same local network as that connected to the mobile terminal 104. Also, the device capability confirmation unit 506 has a function that uploads the acquired information to the designated service. A program for realizing the device capability confirmation unit 506 is stored in the ROM 303.

The upload unit 504, the device search unit 505, and the device capability confirmation unit 506 collectively function as a processing execution unit that executes local processing required for execution of print-associated processing by a print control device. In the present embodiment, the upload unit 504, the device search unit 505, and the device capability confirmation unit 506 are local modules that are a part of programs constituting the mobile application 501 but may also be independent from the mobile application 501.

The DB server 110 includes a route management unit 521, a job management unit 522, and a file management unit 523. The route management server 105 includes a route management service 511. The upload server 106 includes an upload service 531. The device designation server 107 includes a device designation service 541. The print setting server 108 includes a print setting service 551. The print server 109 includes a print queue 562 and a print service 561. The image forming device 111 includes a job request unit 571 and an output control unit 572.

The route management unit 521 is a data store to be hosted by the DB server 110. A program for realizing the route management unit 521 is stored in the ROM 403. The CPU 401 loads the program into the RAM 402 for execution. The route management unit 521 has a function that holds "route information" defining the order in which a plurality of services is executed when print processing is realized by a combination of the plurality of services. For this purpose, the route management unit 521 has a route definition table and a route list table.

The route management service 511 is a service to be hosted by the route management server 105. A program for realizing the route management service 511 is stored in the ROM 403. The CPU 401 loads the program into the RAM 402 for execution. The route management service 511 distributes route information stored in the route management unit 521 to the mobile terminal 104 when accessed by the mobile terminal 104.

The job management unit 522 is a data store to be hosted by the DB server 110. A program for realizing the job management unit 522 is stored in the ROM 403. The CPU 401 loads the program into the RAM 402 for execution. The job management unit 522 has a function that manages a print job when print processing is realized by a combination of the plurality of services. The job management unit 522 has a job management table.

The file management unit 523 is a data store to be hosted by the DB server 110. A program for realizing the file management unit 523 is stored in the ROM 403. The CPU 401 loads the program into the RAM 402 for execution. The file management unit 523 has a function that manages print data or print setting data as a file when print processing is realized by a combination of the plurality of services.

The upload service 531 is a service to be hosted by the upload server 106. A program for realizing the upload service 531 is stored in the ROM 403. The CPU 401 loads the program into the RAM 402 for execution. The upload service 531 has a function that distributes an HTML including an instruction character string for uploading a file to be printed stored in a mobile terminal when an access is made from the mobile terminal 104. The details of the instruction character string will be described below.

The device designation service 541 is a service to be hosted by the device designation server 107. A program for realizing the device designation service 541 is stored in the ROM 403. The CPU 401 loads the program into the RAM 402 for execution. The device designation service 541 has a function that distributes an HTML including an instruction character string for uploading information about an image forming device, which exits on the network 100 which is the same local network as that connected to the mobile terminal 104, when accessed by the mobile terminal 104. Also, the device designation service 541 has a function that presents a device designation HTML on the basis of the information uploaded by the mobile terminal 104.

The print setting service 551 is a service to be hosted by the print setting server 108. A program for realizing the print setting service 551 is stored in the ROM 403. The CPU 401 loads the program into the RAM 402 for execution. The print setting service 551 has a function that distributes an HTML including an instruction character string for uploading capability information about a specified image forming device, which exists on the network 100 which is the same local network as that connected to the mobile terminal 104, when accessed by the mobile terminal 104. Also, the print setting service 551 has a function that presents a print setting HTML on the basis of the information uploaded by the mobile terminal 104.

The print service 561 is a service to be hosted by the print server 109. A program for realizing the print service 561 is stored in the ROM 403. The CPU 401 loads the program into the RAM 402 for execution. When accessed by the mobile terminal 104, the print service 561 acquires a print data file and a print setting file from the file management unit 523 on the basis of the JobID received when an access is made. Then, the print service 561 has a function that links the acquired print data file and print setting file to the ID of the image forming device on which print data is to be printed and stores them in the print queue 562.

The print queue 562 is a service to be hosted by the print server 109. A program for realizing the print queue 562 is stored in the ROM 403. The CPU 401 loads the program into the RAM 402 for execution. The print queue 562 has a function that distributes a document file to be printed and print setting information, which are linked to the image forming device ID received when an access is made, to the image forming device 111 when accessed by the image forming device 111.

A program for realizing the job request unit 571 is stored in the ROM 403 provided in the image forming device 111. The CPU 401 loads the program into the RAM 402 for execution. The job request unit 571 has a function that executes a print data request to the print queue 562 at regular intervals with the ID of the image forming device to be held. A program for realizing the output control unit 572 is stored in the ROM 403 provided in the image forming device 111. The CPU 401 loads the program into the RAM 402 for execution. The output control unit 572 has a function that performs print output onto a recording medium such as paper based on the print data file and the print setting file acquired by the job request unit 571.

FIGS. 5A to 5C are diagrams illustrating examples of a job management table, a route definition table, and a route list table. Each of the job management table, the route definition table, and the route list table is stored in a predetermined storage unit. FIG. 5A shows the job management table. The job management table is a table that manages a job corresponding to a print service selected by a user on a mobile terminal. Information set on the job management table is described as "job information". The job management table has data items including a JobID 601, a LocalKey 602, a RouteID 603, a CurrentRouteNo 604, a DataPath 605, a SettingPath 606, and a TargetPrinter 607. The JobID 601 is identification information for uniquely identifying a job. The job corresponds to a print service selected by a user.

The LocalKey 602 is a LocalKey that is issued for each job. The RouteID 603 is identification information for uniquely identifying a route that is being executed by the job. The route indicates an entity that executes a service (print-associated processing) for realizing a print service selected by a user and the print-associated processing. The CurrentRouteNo 604 is identification information for uniquely identifying a service (print-associated processing) that is currently being executed by the job. The DataPath 605 is a file path indicating where a document file to be printed, which is linked to the job, is stored in the file management unit 523.

The SettingPath 606 is a file path indicating where a print setting information file linked to the job is stored in the file management unit 523. The TargetPrinter 607 is the name of a device on which print data is to be printed, i.e., the name of an image forming device designated as the print output destination.

FIG. 5B shows the route definition table. The route definition table is a table that defines a route for realizing a print service. The route definition table has data items including a RouteID 611, a ServiceNo 612, and a ServiceURL 613.

The RouteID 611 is identification information for uniquely identifying a route. The ServiceNo 612 indicates the order of a service for executing print-associated processing from among the services indicated by routes. The ServiceURL 613 indicates address information about the service. In other words, the route definition table stores in advance correspondence information between a print service and address information about a print-associated processing unit that executes print-associated processing corresponding to the print service.

FIG. 5C shows the route list table. Routelist information is preset on the route list table. Routelist information has data items including a RouteID 621 and a RouteName 622. The RouteID 621 is identification information for uniquely identifying a route. The RouteName 622 indicates the name of a route.

Figure 6:
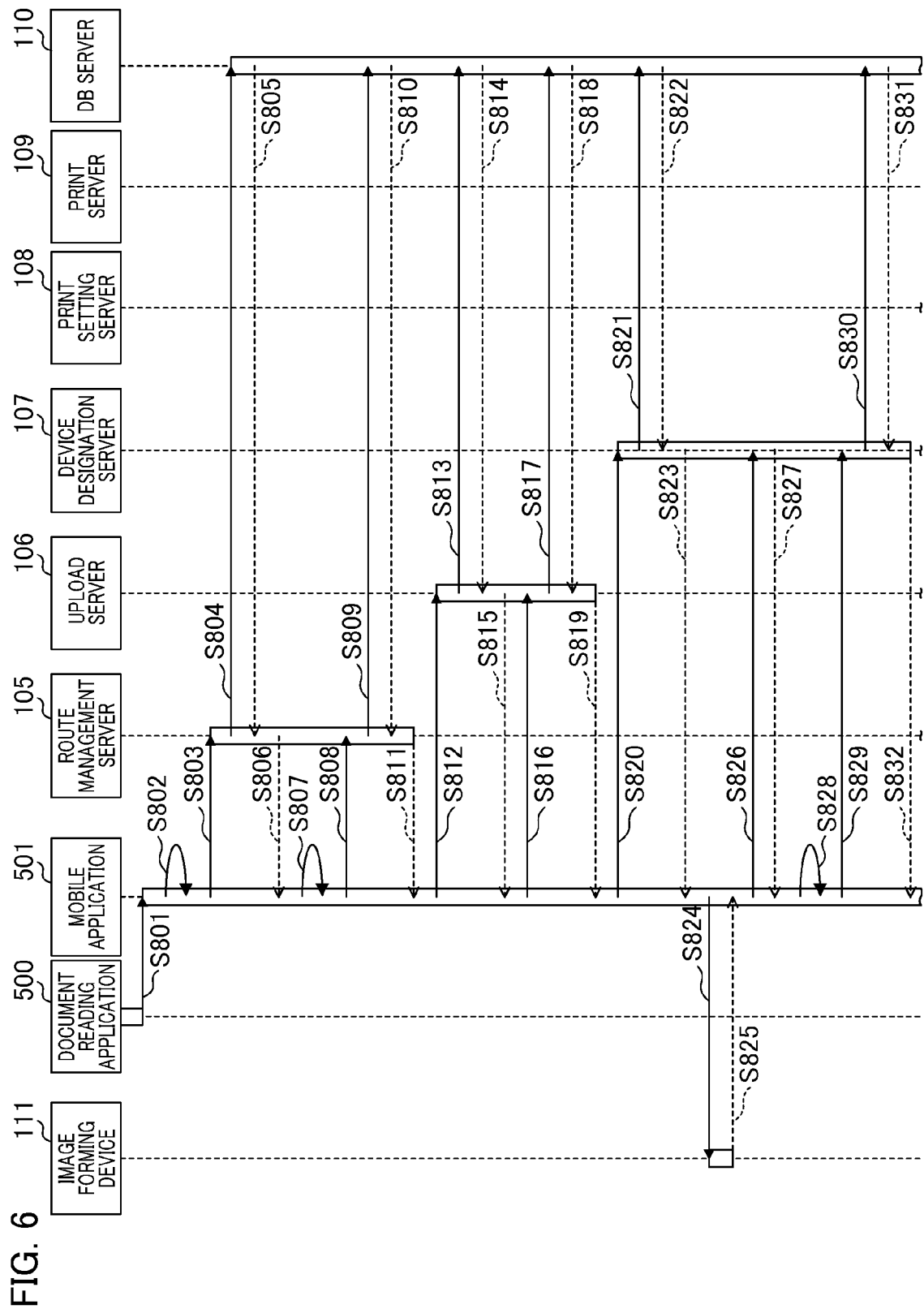
FIG. 6 is a sequence diagram illustrating an example of operation processing performed by a print system.
Figure 7:
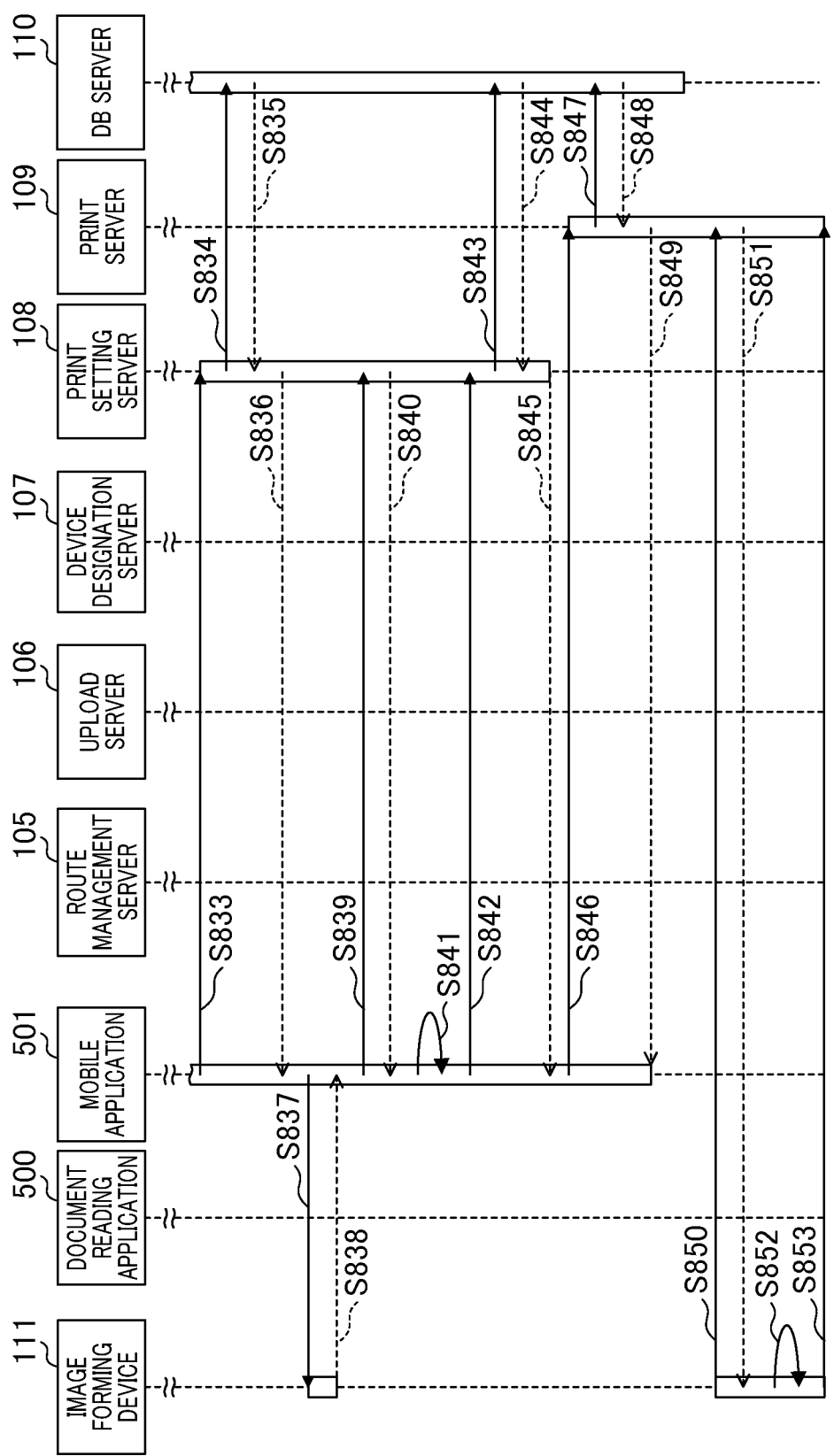
FIG. 7 is a sequence diagram illustrating an example of operation processing performed by a print system.

FIG. 6 and FIG. 7 are sequence diagrams illustrating examples of operation processing performed by the print system of the present embodiment. As shown in FIG. 6, the document reading application 500 firstly calls the mobile application 501 (step S801). At this time, the local path of a document displayed by the document reading application 500 is passed to the mobile application 501. The mobile application 501 issues a LocalKey (step S802).

The LocalKey is a uniquely identifiable value that is generated for each request. The LocalKey is generated, for example, by adding a terminal ID to a GUID. Here, although the upload unit 504, the device search unit 505, and the device capability confirmation unit 506 are present as local modules in the mobile terminal 104, a character string called "instruction character string" corresponding to each of these local modules is pre-defined. In step S802, the control 502 further functions as an encryption unit that encrypts these instruction character strings using the LocalKey to thereby generate an encrypted character string. The control 502 holds the encrypted character string in a storage unit.

Next, the mobile application 501 transmits a route information acquisition request to the route management server 105 (step S803). The route management server 105 that has received the route information acquisition request accesses the DB server 110 (step S804). The route management server 105 acquires route list information set on the route list table (FIG. 5C) as a response to the access (step S805).

The route management server 105 generates an HTML to perform display by the browser control 502 on the basis of the acquired route list information, and transmits the HTML to the mobile application 501 (step S806). The browser control 502 of the mobile application 501 receives the HTML, and display, for example, the route selection screen shown in FIG. 8A.

Figure 8A:
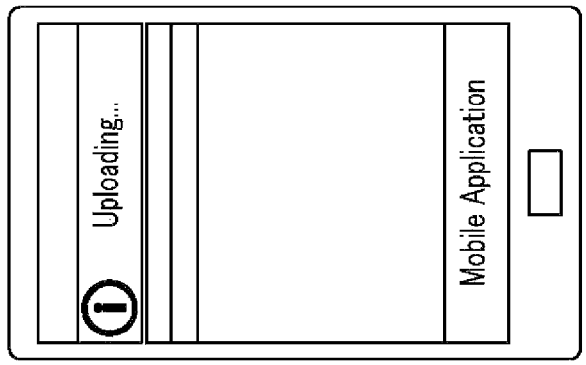
FIGS. 8A to 8D are diagrams illustrating examples of screens to be displayed on a mobile terminal.
Figure 8B:
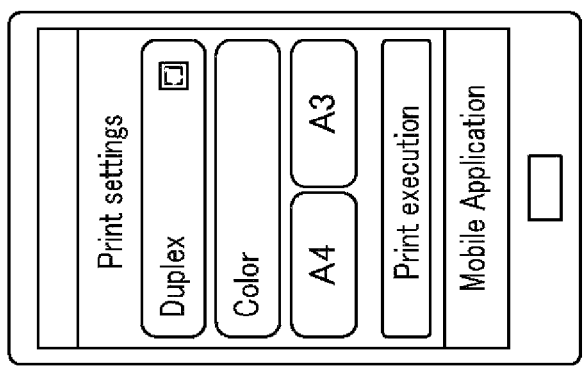
Figure 8C:
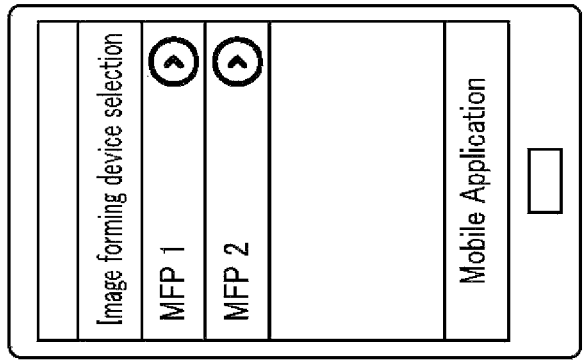

FIGS. 8A to 8D are diagrams illustrating examples of screens to be displayed on a mobile terminal. FIG. 8A shows an exemplary route selection screen. A route is displayed on the route selection screen. FIG. 8B shows an exemplary printer selection screen. FIG. 8C shows an exemplary print setting screen.

Referring back to FIG. 6, when a user of the mobile terminal 104 performs a route selection operation on the route selection screen, the mobile application 501 selects a route depending on the selection operation. Selecting a route means to select a print service. The mobile application 501 transmits route information (RouteID) corresponding to the selected route and the generated LocalKey to the route management server 105 (step S802). In other words, the mobile application 501 functions as a selection unit that selects a print service and transmits selection information about the print service to a print control device via a network. In this example, print service selection information is route information. Also, the mobile application 501 functions as a key transmission unit that generates key information corresponding to print-associated processing executed by a server provided in a print control device and transmits the generated key information to the server via a network. In step S802, the mobile application 501 may function as a distribution unit that includes an encrypted instruction character string instead of key information to print service selection information and then transmits the resulting selection information to the route management server 105 (distributes a request).

Next, the route management server 105 receives route information and a LocalKey. Then, the route management server 105 transmits a job issuance request including the received information to the job management unit 522 of the DB server 110 (step S809). The job management unit 522 sets job information to the job management table (FIG. 5A) depending on the job issuance request. The JobID 601 is automatically generated by the job management unit 522 so as to be unique in the job management table. Since the LocalKey 602 and the RouteID 603 are transmitted together with the job issuance request, these values are stored. The CurrentRouteNo 604 stores "1" indicating the first RouteNo. At this time, the DataPath 605, the SettingPath 606, and the TargetPrinter 607 are left in blank.

Next, the job management unit 522 provided in the DB server 110 returns the value of the issued JobID 601 and the URL of a service to be next accessed by the mobile terminal 104 to the route management server 105 (step S811). For this purpose, the job management unit 522 refers to the job management table (FIG. 5A) and the route definition table (FIG. 5B) to thereby specify the URL of a service to be next accessed by the mobile terminal 104 (hereinafter referred to as "next access URL").

For example, in the record of the job, the RouteID 603 is "Route1" and the CurrentRouteNo 604 is "1". Thus, the job management unit 522 refers to the route definition table and specifies a record (data in one row) having the RouteID of "1" and the ServiceNo of "1" which is the same as that of the CurrentRouteNo 604. The job management unit 522 specifies the URL set on the ServiceURL 613 included in the specified record as the next access URL. In the example shown in FIG. 5B, the ServiceURL "https://www.printflow.co.jp/upload/" is specified as the next access URL. In other words, the upload service 531 is specified as a service to be next accessed by the mobile terminal 104.

Referring back to FIG. 6, the route management server 105 adds a JobID to the next access URL to thereby set a URL parameter. The route management server 105 sets, for example, "https://www.printflow.co.jp/upload/?JobID=job1" as a URL parameter. The route management server 105 returns to the mobile application 501 a redirect response in which the URL parameter is designated as an address to thereby instruct the mobile application 501 to redirect to the designated address (step S811). Hereinafter, information indicating an address designated by a redirect response is described as "redirect request destination address information".

In other words, the route management server 105 functions as an access instruction unit that executes the following processing. The route management server 105 specifies a print-associated processing unit (the upload service 531), which is indicated by the RouteID received from the mobile terminal 104, that executes print-associated processing corresponding to the selected print service. Then, the route management server 105 instructs the mobile application 501 provided in the mobile terminal 104 to access (redirect to) the specified print-associated processing unit.

Next, the mobile application 501 that has received the redirect response redirects to the designated address (step S812). In this example, the mobile application 501 redirects to (accesses) the upload service 531. In other words, the mobile application 501 functions as an access unit that accesses the upload service 531 via the network. Also, each of the servers provided in the print control device of the present embodiment includes a reception unit that receives an access from the mobile terminal 104 via the network. In step S812, the upload service 531 functions as a reception unit.

Information (redirect information) transmitted through redirection from the mobile application 501 to the upload service 531 include redirect request destination address information. The upload service 531 that has been redirected from the mobile application 501 extracts a URL parameter from redirect request destination address information included in redirect information to thereby acquire a JobID.

Next, the upload service 531 transmits a job information acquisition request in which the acquired JobID is designated as a parameter to the job management unit 522 on the DB server 110 (step S813). Subsequently, the job management unit 522 acquires job information corresponding to the JobID which has been designated as the parameter in the job information acquisition request, and returns the job information to the upload server 106 (step S814).

Next, the upload service 531 of the upload server 106 creates an HTML on the basis of the returned job information. More specifically, the upload service 531 encrypts a predetermined instruction character string using the LocalKey included in job information. The instruction character string to be encrypted is an instruction character string corresponding to a local module that executes processing required for provision of an upload service by the upload service 531 from among the local modules provided in the mobile terminal 104. In other words, the instruction character string functions as control information for calling a processing execution unit that execute local processing, which is provided in the mobile terminal 104.

In this example, the upload service 531 encrypts an instruction character string (e.g., CCS_UPLOAD) corresponding to the upload unit 504 that executes processing for uploading a document file to be printed.

Next, the upload service 531 generates an HTML response including the encrypted instruction character string, and transmits the generated HTML response to the mobile application 501 (step S815). In other words, each of the servers provided in the print control device of the present embodiment includes a request unit, and the request unit executes the following processing. The request unit returns an execution request, which is a request for execution of local processing required for execution of print-associated processing to be executed by each server, including the encrypted instruction character string as a response to the access to the mobile terminal 104 via the network. In step S815, the upload service 531 functions as a request unit. Also, the mobile application 501 functions as a request reception unit that receives an execution request from the request unit provided in the print control device via the network. When the mobile application 501 includes an instruction character string corresponding to upload processing in print service selection information and then transmits the resulting selection information to the route management server 105 in step S802, the upload service 531 executes the following processing. The upload service 531 transmits an HTML response including the instruction character string to the mobile application 501.

The controller 503 of the mobile application 501 that has received the HTML response from the upload service 531 functions as a calling unit that calls the upload unit 504 serving as a processing execution unit for responding to the instruction character included in the HTML response. Then, the upload unit 504 executes the following upload processing. In other words, the mobile application 501 functions as a detection unit that detects whether or not an instruction character string is included in the response from the server side. Also, the controller 503 calls the corresponding module if it is detected that the instruction character string is included in the response. Then, the called module executes a local function.

The upload unit 504 acquires a document file to be printed from the local path of the document acquired in step S801. Then, the upload unit 504 uploads the acquired document file to be printed to the upload server 106 (step S816). In other words, the mobile terminal 104 includes a transmission unit that transmits the result of execution of local processing to the print control device via the network. In step S816, the upload unit 504 functions as a transmission unit. Also, each of the servers provided in the print control device of the present embodiment includes a result reception unit that receives the result of execution of the local processing from the mobile terminal 104 that has called a local module corresponding to the instruction character string included in the execution request and executed the local processing by calling via the network. In step S816, the upload service 531 functions as a result reception unit.

Next, the upload server 106 makes a storage request for the uploaded document file to the file management unit 523 on the DB server 110 (step S817). The upload server 106 adds the uploaded document file and JobID as parameters to the storage request. The file management unit 523 that has received the storage request saves the document file included in the storage request in the local path. Also, the file management unit 523 accesses the job management table, and saves the local path in which the document file is saved in the DataPath 605 corresponding to the JobID included in the storage request.

In other words, each of the servers provided in the print control device of the present embodiment includes an association processing execution unit that executes print-associated processing using the result of execution of local processing received from the mobile terminal 104. In step S817, the upload service 531 and the DB server 110 collectively function as an association processing execution unit and save the uploaded document file in the local path.

Next, the file management unit 523 returns a response indicating the fact that the document file is normally stored to the upload server 106 (step S818). Then, in step S819, the upload server 106 instructs the mobile application 501 to redirect a server to be next accessed by the mobile terminal 104, i.e., the device designation server 107 (provides a redirect instruction).

FIG. 9 is a sequence diagram illustrating exemplary detailed processes in steps S812 to S819 shown in FIG. 6. The process in step S901 shown in FIG. 9 corresponds to that in step S812 shown in FIG. 6. In step S901, the browser control 502 redirects to the address of the service designated by the URL parameter. In this example, the browser control 502 redirects to the upload service 531.

Upon receiving a redirect access, the upload service 531 acquires a JobID from the URL parameter. Then, in step S902 corresponding to step S813 shown in FIG. 6, the upload service 531 makes a job information acquisition request to the job management unit 522 using the acquired JobID as the parameter. The job management unit 522 extracts job information corresponding to the JobID designated as the parameter from the job management table. Then, in step S903 corresponding to step S814 shown in FIG. 6, the job management unit 522 returns the job information to the upload service 531.

The upload service 531 creates an HTML on the basis of the returned job information (step S904). More specifically, the upload service 531 encrypts an instruction character string corresponding to the local module desired to be executed by the mobile terminal 104 using the LocalKey included in job information. In this example, the upload service 531 encrypts an instruction character string corresponding to the upload unit 504 using the LocalKey. In the following, the encrypted instruction character string is described as an "encrypted character string".

Next, the upload service 531 generates an HTML response including the encrypted character string, and returns the generated HTML response to the browser control 502 (step S905). When the browser control 502 receives the HTML response, the browser control 502 calls the controller 503 (step S906). The controller 503 analyzes the HTML response received by the browser control 502. The controller 503 compares the encrypted character string included in the HTML response with the encrypted character strings held by the storage unit in step S802 shown in FIG. 6. Then, the controller 503 determines whether or not there is an encrypted character string matched with the encrypted character string included in the HTML response from among the encrypted character strings held by the storage unit in step S802 shown in FIG. 6.

When there is an encrypted character string matched with the encrypted character string included in the HTML response from among the encrypted character strings held by the storage unit in step S802 shown in FIG. 6, the controller 503 executes the following processing. The controller 503 calls a local module corresponding to the matched encrypted character string and executes the local module (step S908). In this example, the controller 503 executes the upload unit 504.

Figure 8D:

The executed local module accesses the browser control 502 (step S909). Then, the local module instructs the browser control 502 to display a screen (in-process screen) indicating that local processing is being executed. The browser control 502 displays, for example, an in-process screen as shown in FIG. 8D in accordance with an instruction given by the local module. In other words, the browser control 502 functions as a display unit that displays a screen indicating that local processing is being executed when the local processing is being executed by the local module.

The local module receives a response from the browser control 502 (step S910), and executes a local module function. Then, the local module instructs the browser control 502 to present a screen reflecting the progress of processing (step S912). Then, the local module receives a response from the browser control 502 (step S913). In this manner, the procedure through which the local module proceeds processing can be reflected to the browser control 502.

When the processes in the steps S911 to S913 are repeated until the execution of the local module is completed, the local module uploads the collected data to a service (step S914). In this example, the upload unit 504 uploads a document file to the upload server 106.

The service transmits the uploaded information to the file management unit 523 and the job management unit 522 for storage (step S915). In step S915, the job management unit 522 further increments the CurrentRouteNo in the job management table by one.

Next, the job management unit 522/the file management unit 523 returns a response to the upload service 531 (step S916). The response includes the URL of a service to be next accessed by the mobile terminal 104. For this purpose, the job management unit 522 refers to the route definition table, and acquires a ServiceURL corresponding to the current CurrentRouteNo. In this example, the job management unit 522 acquires a ServiceURL corresponding to the device designation service 541. The job management unit 522 returns a response in which the acquired ServiceURL is included as the URL of a service to be next accessed by the mobile terminal 104. In this manner, the upload service 531 specifies the device designation service 541 as a service for executing print-associated processing to be next executed.

In other words, the service and the DB server 110 which function as association processing execution unit refer to the route definition table after executing print-associated processing, and specify address information about a print-associated processing unit that executes print-associated processing to be next executed. Then, as described below, the service instructs the mobile application 501 to access a print-associated processing unit corresponding to the specified address information.

The upload service 531 returns a response to the local module (step S917). The response includes the URL of a service (device designation service) to be next accessed by the mobile terminal 104. Upon receiving the response, the local module passes similar information to the controller 503 to thereby provide a completion notification (step S918). Then, the controller 503 generates an URL parameter in which a JobID is attached to the URL of a service to be next accessed, and instructs the browser control 502 to access the address indicated by the generated URL parameter (step S919).

The same processes as those described with reference to FIG. 9 are also executed in steps S820 to S827 shown in FIG. 6 and steps S833 to S840 shown in FIG. 7. In other words, after execution of print-associated processing, the service provided in each of the servers specifies a service for executing print-associated processing to be next executed from among a plurality of print-associated processing corresponding to the print service selected by the mobile terminal 104. Then, the service instructs the mobile application 501 provided in the mobile terminal 104 to access the specified service.

Referring back to FIG. 6, the mobile application 501 redirects to the device designation server 107 in accordance with the redirect instruction received in step S819. The device designation server 107 redirected by the mobile application 501 acquires job information from the DB server 110 (steps S821 and S822). The device designation server 107 acquires a LocalKey from the job information. The device designation server 107 generates an encrypted character string by encrypting the instruction character string (e.g., CCS_FIND-PRINTER) corresponding to the device search unit 505 using the LocalKey. Then, the device designation server 107 generates an HTML response including the generated encrypted character string, and returns the HTML response as a response to the mobile application 501 (step S823).

Next, the mobile application 501 detects an encrypted character string included in the HTML response which has been returned from the device designation server 107 as a response. The controller 503 of the mobile application determines whether or not there is an encrypted character string matched with the encrypted character string included in the HTML response from among the encrypted character strings held by the storage unit in step S802 shown in FIG. 6.

When there is an encrypted character string matched with the encrypted character string included in the HTML response from among the encrypted character strings held by the storage unit in step S802 shown in FIG. 6, the controller 503 executes the following processing. The controller 503 calls a local module corresponding to an instruction character string corresponding to the matched encrypted character string, that is, the device search unit 505. Then, the device search unit 505 broadcasts a printer search packet on the LAN connected to the mobile application 501 (step S824). When an image forming device which is present on the same LAN as that connected to the mobile application 501 receives a printer search packet, the image forming device sends a packet indicating that there is a printer to the mobile application 501 serving as the packet sender (step S825). In this manner, the mobile application 501 can acquire list information (printer list information) about the printers which exist on the LAN.

Next, the device search unit 505 of the mobile application 501 converts the acquired printer list information into, for example, XML data format as shown in FIG. 10A. Then, the mobile application 501 transmits the printer list information to the device designation server 107 (step S826).

The device designation server 107 generates an HTML indicating a printer selection screen based on the received printer list information, and returns the HTML to the mobile application 501 (step S827). The mobile application 501 displays, for example, the printer selection screen shown in FIG. 8B based on the HTML returned from the device designation server 107.

The mobile application 501 selects a printer on which print data is to be printed in accordance with a user's operation on the printer selection screen (step S828). Subsequently, the mobile application 501 transmits a printer ID corresponding to the selected printer to the device designation server 107 (step S829). In the present embodiment, the printer ID is a value in the ID element included in the printer element of XML data shown in FIG. 10A. The mobile application 501 transmits the printer ID with the JobID to the device designation server 107.

Next, the device designation server 107 transmits information about the printer on which print data is to be printed and the JobID to the DB server 110 (step S830). The job management unit 522 on the DB server 110 stores information about the printer on which print data is to be printed in the TargetPrinter 607 in the job management table, and increments the CurrentRouteNo by one. The DB server 110 transmits the URL of a service to be next accessed by the mobile terminal 104 (in the present embodiment, the print setting service 551) to the device designation server 107 (step S831).

The device designation server 107 instructs the mobile application 501 to redirect to an address in which the JobID serving as an URL parameter is attached to the URL of a service to be next accessed, which has been received from the DB server 110 (step S832).

Next, in step S833 shown in FIG. 7, the mobile application 501 redirects to the print setting service 551 on the print setting server 108. The print setting server 108 acquires job information from the DB server 110 (steps S834 and S835). Subsequently, the print setting server 108 encrypts the instruction character string (e.g., CCS_GETSPEC) for executing the device capability confirmation unit 506 using the LocalKey on the basis of the acquired job information to thereby generate an encrypted character string. The print setting server 108 generates an HTML response including the generated encrypted character string and the printer ID, and returns the generated HTML response as a response to the mobile application 501 (step S836). The printer ID included in the HTML response is a printer ID held in the TargetPrinter 607 on the job management table.

The controller 503 of the mobile application determines whether or not there is an encrypted character string matched with the encrypted character string included in the HTML response from among the encrypted character strings held by the storage unit in step S802 shown in FIG. 6. When there is an encrypted character string matched with the encrypted character string included in the HTML response from among the encrypted character strings held by the storage unit in step S802 shown in FIG. 6, the controller 503 executes the following processing. The controller 503 calls a local module corresponding to an instruction character string corresponding to the matched encrypted character string, that is, the device capability confirmation unit 506.

The device capability confirmation unit 506 requests the printer capabilities of the image forming device 111 to the image forming device 111 corresponding to the printer ID included in the HTML response returned in step S836 (step S837). The image forming device 111 transmits information (printer capability information) indicating the printer capabilities of the image forming device 111 itself to the device capability confirmation unit 506 (step S838).

FIG. 10B shows an example of printer capability information. The XML data shown in FIG. 10B indicates that Duplex (1-side/2-side), Color (color/monochrome), and PaperSize (B5/A4/A3) can be specified as the printer capabilities of the image forming device.

The mobile application 501 transmits printer capability information together with a JobID to the print setting server 108 (step S839). The print setting server 108 creates an HTML indicating a print setting screen on the basis of the acquired printer capability information, and transmits the HTML to the mobile application 501 (step S840). The mobile terminal 104 displays, for example, the print setting screen shown in FIG. 8C based on the HTML received from the print setting server 108.

Next, the mobile application 501 makes a print setting depending on the user's operation on the print setting screen (step S841). The mobile application 501 transmits print setting information indicating the print setting to the print setting server 108. FIG. 10C shows an example of print setting information.

In step S841, the mobile application 501 transmits print setting information and a JobID to the print setting server 108 (step S842).

The print setting server 108 transmits the print setting information and the JobID received from the mobile application 501 to the DB server 110 (step S843). Subsequently, the file management unit 523 on the DB server 110 saves print setting information as a file in a local path. Then, the job management unit 522 saves the file path of the print setting information in the SettingPath 606 corresponding to the JobID, which has been received in step S843, on the job management table. Also, the job management unit 522 increments the CurrentRouteNo corresponding to the JobID by one.

The DB server 110 transmits the URL of a service to be next accessed by the mobile terminal 104 (in the present embodiment, the print service 561) to the print setting server 108 (step S844). The print setting server 108 instructs the mobile application 501 to redirect to an address in which the JobID serving as an URL parameter is attached to the URL of a service to be next accessed (step S845).

Next, the mobile application 501 redirects to the print service 561 on the print server 109 (step S846). The print service 561 acquires the JobID from the URL parameter included in redirect information. Then, the print service 561 makes a request for acquiring print data including the acquired JobID to the DB server 110 (step S847). The print data acquisition request is a request for the acquisition of print data. The print data includes a document file to be printed and print setting information.

The DB server 110 refers to the job management table, and acquires the TargetPrinter 607 corresponding to the JobID included in the print data acquisition request as the ID of a printer on which print data is to be printed. The ID of a printer on which print data is to be printed is the printer ID of an image forming device on which print data is to be printed. Also, the DB server 110 acquires a document file to be printed based on the file path stored in the DataPath 605 corresponding to the JobID. Also, the DB server 110 acquires print setting information based on the file path stored in the SettingPath 606 corresponding to the JobID. Then, the DB server 110 returns the acquired document file to be printed, the acquired print setting information, and the acquired ID of a printer on which print data is to be printed to the print server 109 (step S848).

The print server 109 associates the document file to be printed and print setting information, which have been returned from the DB server 110, with the ID of a printer on which print data is to be printed and stores them as print data in the print queue 562. When print data is stored in the print queue 562, the job management unit 522 of the DB server 110 deletes a record corresponding to the JobID on the job management table. At this time, it indicates the fact that the print server 109 has successfully processed print data. The print server 109 notifies the mobile application 501 of the fact that processing print data has successfully been completed (step S849).

The job request unit 571 of the image forming device 111 polls the print service 561 at regular intervals, and transmits the printer ID of the image forming device 111 itself to the print service 561 upon polling (step S850).

Upon receiving an access from the image forming device 111, the print service 561 searches print data linked to the received printer ID from the print queue 562. When print data in question is searched, the print service 561 transmits print data, that is, a document file to be printed and print setting information to the job request unit 571 of the image forming device 111 (step S851).

The job request unit 571 which has received print data passes print data to the output control unit 572 and causes the output control unit 572 to execute print output processing (step S852). When print output processing has been successfully completed, the job request unit 571 notifies the print service 561 of the fact that print output processing has been successfully completed (step S853). The print service 561 deletes print data for which print output processing has been completed from the print queue 562.

When the print service 561 could not search print data linked to the printer ID from the print queue 562, the print service 561 returns the fact that searching print data has been failed to the image forming device 111, and the job request unit 571 accesses the print server 108 again.

According to the print system of the present embodiment, a service passes an instruction character string incorporated into an HTML to a mobile application, and the mobile application calls and executes a local module corresponding to the instruction character string and transmits the result of execution to the service. In other words, in the print system of the present embodiment, there is no need to provide a resident service such as a Web server in a mobile terminal. Thus, even when the information processing device (mobile terminal) has a strict restriction for resources, the print system of the present embodiment can acquire (feedback) information about the information processing device by providing a local function execution instruction from a print control device to the information processing device.

Also, in the print system of the present embodiment, the print control device transmits an instruction character string to the information processing device and instructs the information processing device to execute a local module provided in the information processing device via the instruction character string. Thus, according to the print system of the present embodiment, even if the OS installed on the information processing device is not a specific OS but any versatile OS, the print control device can instruct the information processing device to execute a local module provided in the information processing device to thereby acquire the result of execution.

Furthermore, in the print system of the present embodiment, the instruction character string is encrypted by the LocalKey issued by the mobile terminal for each job. Thus, security is ensured when the print control device causes the information processing device to execute a local function.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-251474 filed Nov. 17, 2011, which is hereby incorporated by reference herein in its entirety.

What is claimed is:

1. A print system comprising:
   an information processing device; and
   a print control device for executing print control processing,
   wherein the print control device comprises:
      at least one print-associated processing unit configured to execute print-associated processing corresponding to a print service selected by the information processing device,
   wherein the at least one print-associated processing unit comprises:
      a reception unit configured to receive an access from the information processing device via a network;
      a request unit configured to return an execution request to the information processing device as a response to the access from the information processing device via the network, where the execution request is for execution of local processing required for execution of the print-associated processing, and includes control information for calling a processing execution unit which is configured to execute the local processing and is provided in the information processing device;
      a result reception unit configured to receive a result of execution of the local processing from the information processing device that has called a processing execution unit corresponding to control information included in the execution request and executed the local processing via the network; and
      an association processing execution unit configured to execute the print-associated processing using the result of execution of the local processing received by the reception unit,
   wherein the information processing device comprises:
      a processing execution unit configured to execute the local processing;
      an access unit configured to access the reception unit provided in the print control device via the network;
      a request reception unit configured to receive the execution request from the request unit provided in the print control device via the network;
      a calling unit configured to call the processing execution unit corresponding to the control information included in the execution request received by the request reception unit to thereby cause the processing execution unit to execute the local processing;
      a transmission unit configured to transmit the result of execution of the local processing by the processing execution unit to the result reception unit provided in the print control device via the network;

a key transmission unit configured to generate key information corresponding to the print-associated processing executed by the at least one print-associated processing unit and transmit the generated key information to the print control device via the network; and an encryption unit configured to encrypt the control information using the generated key information, wherein the calling unit receives an execution request including control information encrypted by the key information from the request unit provided in the print control device, determines whether or not there is control information, which matches control information included in the execution request received from the request unit, from among control information encrypted by the encryption unit, and calls the processing execution unit corresponding to the matched control information when the matched control information is present, and wherein the request unit provided in the print control device further encrypts control information for calling the processing execution unit configured to execute local processing required for execution of the print-associated processing using the key information received from the key transmission unit provided in the information processing device, and returns the execution request including the encrypted control information to the information processing device.

2. The print system according to claim 1, wherein the information processing device further comprises:
   a selection unit configured to select the print service and transmit selection information about the print service to the print control device via the network, and
wherein the print control device further comprises:
   an access instruction unit configured to specify a print-associated processing unit which is indicated by the selection information about the print service received from the information processing device and executes print-associated processing corresponding to the selected print service, and instructs the access unit provided in the information processing device to access the specified print-associated processing unit.

3. The print system according to claim 1, wherein, after execution of the print-associated processing, the association processing execution unit provided in each of the print-associated processing units specifies a print-associated processing unit that executes print-associated processing to be next executed from among print-associated processing corresponding to the selected print service, and instructs the access unit provided in the information processing device to access the specified print-associated processing unit.

4. The print system according to claim 1,
wherein the print control device further comprises:
   a storage unit configured to store correspondence information between a print service and address information about a print-associated processing unit that executes print-associated processing corresponding to the print service in advance, and
wherein, after execution of the print-associated processing, the association processing execution unit refers to the correspondence information stored in the storage unit, specifies address information about a print-associated processing unit that executes the print-associated processing to be next executed, and instructs the access unit provided in the information processing device to access the print-associated processing unit corresponding to the specified address information.

5. The print system according to claim 1,
wherein the information processing device further comprises:
   a display unit configured to display a screen indicating that the local processing is running during execution of the local processing by the processing execution unit.

6. A print control device comprising:
at least one print-associated processing unit configured to execute print-associated processing corresponding to a print service selected by an information processing device,
wherein the at least one print-associated processing unit comprises:
   a reception unit configured to receive an access from the information processing device via a network;
   a request unit configured to return an execution request to the information processing as a response to the access from the information processing device via the network, where the execution request is for execution of local processing required for execution of the print-associated processing, and includes control information for calling a processing execution unit which is configured to execute the local processing and is provided in the information processing device;
   a result reception unit configured to receive the result of execution of the local processing from the information processing device that has called a processing execution unit corresponding to control information included in the execution request and executed the local processing via the network; and
   an association processing execution unit configured to execute the print-associated processing using the result of execution of the local processing received by the result reception unit,
wherein the request unit further encrypts control information for calling the processing execution unit, provided in the information processing device, configured to execute local processing required for execution of the print-associated processing using key information generated and transmitted by a key transmission unit provided in the information processing device, and returns the execution request including the encrypted control information to the information processing device, and
wherein a calling unit provided in the information processing device receives an execution request including control information encrypted by the key information from the request unit, determines whether or not there is control information, which matches control information included in the execution request received from the request unit, from among control information encrypted by an encryption unit provided in the information processing device, and calls the processing execution unit corresponding to the matched control information when the matched control information is present.

7. An information processing device comprising:
a processing execution unit configured to execute local processing;
an access unit configured to access a print control device including at least one print-associated processing unit configured to execute print-associated processing corresponding to a print service selected by the information processing device via a network;
a request reception unit configured to receive an execution request as a response to the access from the print control device via the network, where the execution request is for execution of local processing required for execution of the print-associated processing, and includes control information for calling a processing execution unit which is configured to execute the local processing and is provided in the information processing device;

a calling unit configured to call the processing execution unit corresponding to the control information included in the execution request received by the request reception unit to thereby cause the processing execution unit to execute the local processing;

a transmission unit configured to transmit the result of execution of the local processing by the processing execution unit to a result reception unit provided in the print control device via the network;

a key transmission unit configured to generate key information corresponding to the print-associated processing executed by the at least one print-associated processing unit and transmit the generated key information to the print control device via the network; and an encryption unit configured to encrypt the control information using the generated key information, wherein the calling unit receives an execution request including control information encrypted by the key information from a request unit provided in the print control device, determines whether or not there is control information, which matches control information included in the execution request received from the request unit, from among control information encrypted by the encryption unit, and calls the processing execution unit corresponding to the matched control information when the matched control information is present, and wherein the request unit provided in the print control device further encrypts control information for calling the processing execution unit configured to execute local processing required for execution of the print-associated processing using the key information received from the key transmission unit, and returns the execution request including the encrypted control information to the information processing device.

* * * * *